Aug. 26, 1952     L. V. DAY     2,608,312
FLAT TIRE DOLLY
Filed Dec. 8, 1947     2 SHEETS—SHEET 1
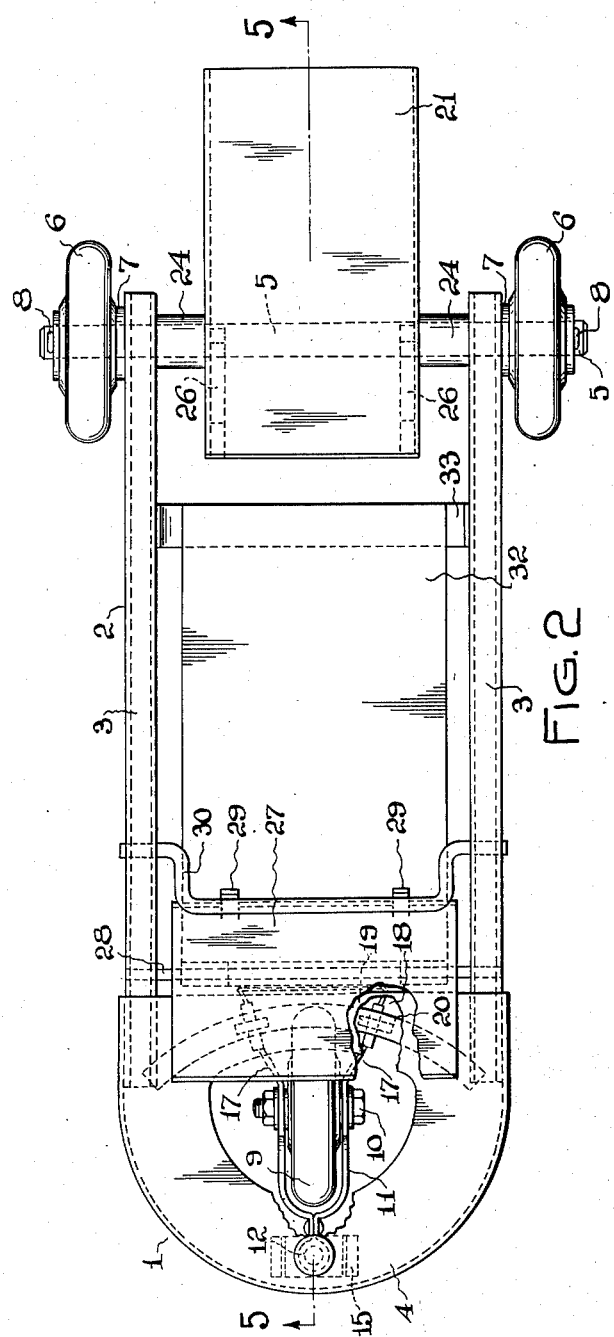
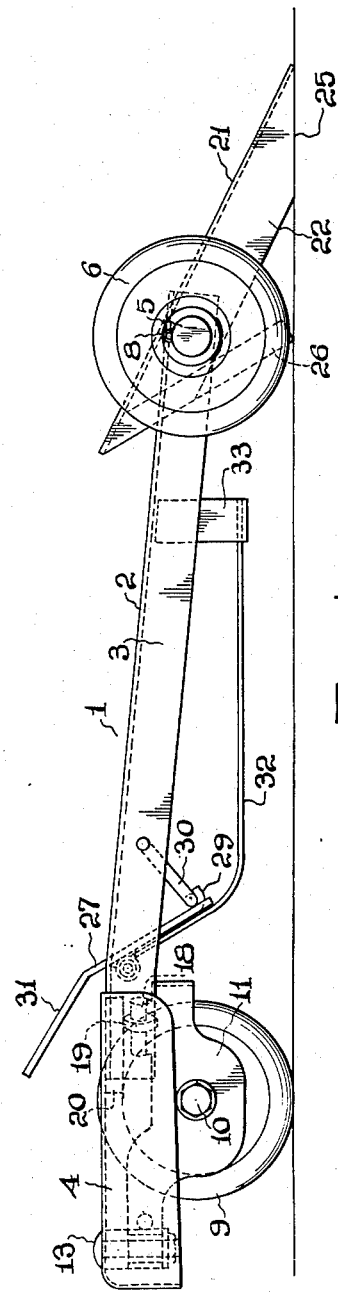
INVENTOR.
LUTHER V. DAY
BY *William Isler*
ATTORNEY Aug. 26, 1952     L. V. DAY     2,608,312
FLAT TIRE DOLLY Filed Dec. 8, 1947     2 SHEETS—SHEET 2

*INVENTOR.*
LUTHER V. DAY
BY William Isler
*ATTORNEY*

Patented Aug. 26, 1952

2,608,312

UNITED STATES PATENT OFFICE 2,608,312

FLAT TIRE DOLLY

Luther V. Day, Gosport, Ind., assignor to National Tool and Die Company, Inc., Louisville, Ky., a corporation of Kentucky Application December 8, 1947, Serial No. 790,416

12 Claims. (Cl. 214—65)

This application is a continuation-in-part of my copending application, Serial No. 768,212, filed August 12, 1947, entitled "Emergency Tire Substitute for Wheeled Vehicles."

This invention relates generally to devices which are used as tire substitutes to permit operation of a wheeled vehicle in the event that one of its pneumatic tires is accidentally deflated or punctured. More specifically, the present invention relates to improvements in the type of device commonly known as a "dolly."

Often the drivers of automobiles or trucks have the misfortune of getting a punctured tire when they are remote from a garage or service station. Although the driver of an automobile can usually change the flat tire by replacing it with a spare tire carried for that purpose, occasionally this remedy is either undesirable or unavailable. For example, many women drivers have neither the strength nor skill to change tires on an automobile; often a truck driver does not carry the necessary equipment which is required for changing tires; the spare tire may have been previously punctured and not yet repaired; or the driver cannot or does not want to bother himself with replacing the tire.

In any of the examples given, the driver must either attempt to obtain assistance, which may be a long time in coming, or he may attempt to travel on the deflated tire, thereby injuring the tire.

It is the primary object of the present invention to provide a device which will permit the vehicle to be driven without injury to the punctured tire, thereby making it possible for the driver to reach a garage or service station where the tire may be repaired.

Another object of the invention is to provide such a device which can be utilized without the use of tools or additional equipment.

Still another object of the present invention is to provide a device of the character described, which is adapted to raise the wheel of a vehicle and thus maintain and carry the deflated tire above the road surface.

A further object of the invention is to provide such a device which is adapted to quickly conform to changes in the direction of movement of the vehicle so as to permit proper steering of the vehicle.

An additional object of the present invention is to provide improved means for positive cradling of the tire on the device.

Still another object of my invention is to provide a device of the character described, which is adapted to remain reasonably stationary when subjected to the forward thrust of the wheel as it moves into elevated position.

Other objects and advantages of my invention will become apparent during the course of the following description and with reference to the annexed drawings forming a part thereof.

In the accompanying drawings, forming a part of this specification, and in which like numerals are used to designate like parts throughout the same, Fig. 1 is a side elevational view of a dolly embodying the features of my invention.

Fig. 2 is a plan view of the dolly with certain portions broken away to more clearly show the mounting arrangement of the front wheel of the dolly.

Figure 3:
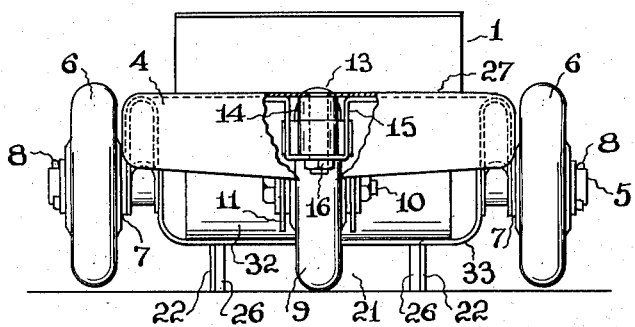
Fig. 3 is a front elevational view of the dolly.

The dolly, which is designated generally by the numeral 1, comprises a chassis or frame 2 formed by parallel spaced side rails 3 of channel-like cross-section and a formed skirt 4 which is joined to one end of the side rails 3 by welding. The other ends of the side rails 3 are provided with openings to permit the passage therethrough of an axle 5 on the opposite end of which are rotatably mounted rubber-tired ball-bearing wheels 6. The wheels 6 are held in spaced relationship on the axle by means of washers 7 which are carried by the axle adjacent each of the side rails 3 and by cotter pins 8 which extend diametrically through the axle at the extreme ends thereof.

The front of the dolly 1 is supported by a guide wheel 9 which is mounted in such a manner as to be quickly responsive to a change in direction of travel, but which, nevertheless, firmly supports the vehicle wheel without causing undue binding or other restriction on free pivotal movement of the guide wheel. The guide wheel 9 is mounted on an axle bolt 10 which, in turn, is supported by a yoke member 11. The yoke 11 is so formed on one portion thereof as to provide a sleeve bearing 12 which is adapted to be pivotally secured to a king-pin 13 which depends vertically from the skirt 4. A thrust bearing 14 is mounted on the king-pin between the yoke and the undersurface of the skirt 4. The threaded end of the king-pin 13 projects through a bracket 15 which is secured, as by welding, to the under surface of the skirt 4, and the king-pin is secured by means of a nut 33. Thus the forepart of the yoke 11 is so mounted so as to permit pivotal movement of the yoke about the king-pin 13.

In order to prevent the undue strain on the yoke and king-pin which would occur if the frame 2 were supported by the guide wheel 9 only at one point, I have distributed the load on the yoke 11 by providing two additional contact points between the yoke and the frame. For this purpose I have affixed to each leg 17 of the yoke a pin 18 which surmounts the edge of the leg. The pin serves to carry a roller 19 which is rotatably mounted thereon, each of the rollers 19 being radially equidistant from the king-pin 13. The rollers are adapted to contact and roll over the surface of an arcuate track 20 which is rigidly secured to each of the side rails 3. Thus the wheel 9 and yoke 11 support the frame 2 at three spaced points, insuring non-binding pivotal movement of the guide wheel and quick response to changes in the direction of travel.

In order that the wheel of an automobile or truck may be driven onto the dolly 1, a ramp 21, having depending sides 22, is pivotally mounted on the axle 5 between the side rails 3, openings 23 being provided in the sides 22 to permit the passage therethrough of the axle. Spacers 24 which are also mounted on the axle 5 on either side of the ramp 21, serve to maintain the ramp approximately midway between the side rails 3.

As will be noted in Figs. 1 and 2, of the total length of the ramp, the greater portion extends rearwardly of the axle 5 so that the ramp will normally tend to remain in the position shown in Fig. 1. The end and sides of the ramp are beveled as at 25 so as to lie flat against the road surface when the ramp is in its normal position.

The other end of the ramp 21 is provided with a pair of parallel spaced legs 26 each of which is rigidly secured, as by welding, to a side 22. The legs 26 project downwardly and rearwardly from the ramp 21 and are of such length as to cause the wheels 6 to be raised slightly (as best seen in Figs. 1 and 3) when the ramp is engaging the road surface.

Thus when the wheel of the vehicle is ascending the ramp, the normal tendency of the dolly to move is overcome by raising the wheels 6 off the road surface and allowing the legs 26 to engage the road surface.

Figure 5:
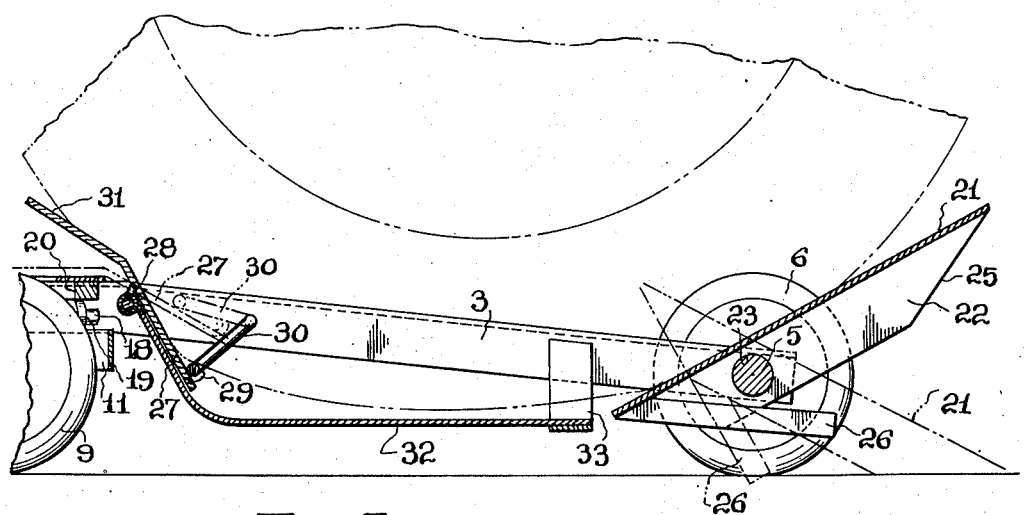
Fig. 5 is a view partly in section and partly in elevation, taken on line 5—5 of Fig. 2, and showing the outline of a tire as supported by the dolly.

As the center of the vehicle wheel passes over the axle 5, the weight of the vehicle will cause the ramp 21 to pivot about the axle and assume a position tangential to the periphery of the tire and wheel, as seen in Fig. 5. Upon rotation of the ramp 21, the legs 26 will be withdrawn from contact with the road surface and the wheels 6 will thereby be lowered so as to come into contact with the road.

The forward portion of the dolly is provided with a bent plate 27 which is pivotally mounted on a cross-bar 28, the ends of which are secured in the side rails 3. The bottom of the plate 27 has formed thereon two spaced projecting tongues 29 which serve as rests for a locking bar 30 which is rotatably secured between the side rails rearwardly of the plate 27.

The plate 27 normally rests in the position shown in dotted lines in Fig. 5, the locking bar 30 not being operative in this position. However, when the tire has ascended the ramp 21 and the ramp has been rotated as previously described, the front portion of the tire will strike the plate 27 and the locking bar 30 almost simultaneously.

Figure 4:
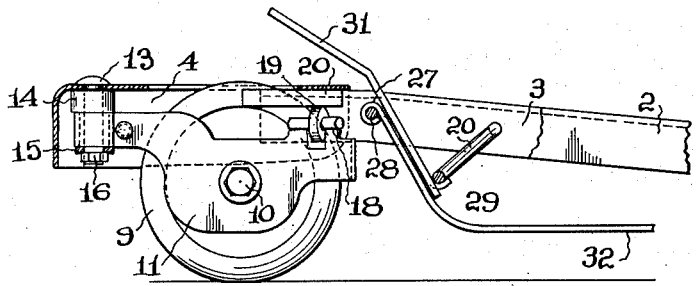
Fig. 4 is a fragmentary side elevational view of the dolly, with a portion of the skirt removed to show details of the structure.

The impact of the tire will cause the plate 27 to pivot about the cross-bar 28 and assume the position shown in solid lines in Figs. 4 and 5. The impact will also force the locking bar 30 into engagement with the tongues 29 and lock the plate against counter-rotation, whereby a portion 31 of the plate 27 engages the tire and prevents further forward movement of the vehicle wheel relative to the dolly.

The vehicle wheel is thus cradled and supported between the plate 27 and the pivoted ramp 21, the weight of the vehicle wheel being sufficient to maintain the ramp 21 in position and the weight of the vehicle wheel supplemented by the locking action of the bar 30 acting to positively maintain the plate 27 in position.

The dolly 1 now takes the place of the vehicle wheel which it is supporting, and the vehicle may be driven at moderate speed to a service station where the tire can be conveniently repaired or changed.

The cross-bar 28 also serves as a support for one end of a shield 32 which is supported at its other end by a carrier strip 33 which is fastened to each side rail 3 of the frame 2, ahead of the wheels 6. The shield has a dual function in that it acts as a secondary support for the wheel of the vehicle in the event the tire is of a size small enough to pass between the ramp 21 and the plate 27, and secondly, the shield 32 prevents road obstructions from hitting the tire and possibly jarring the vehicle wheel out of the dolly 1.

From the foregoing description of the structure and operation of my invention, it will be apparent that I have provided a flat tire dolly which makes it possible for the driver of a vehicle which has a punctured tire to quickly and easily drive the vehicle onto the dolly and proceed to the nearest service station without causing any injury to the tire. The hazard and inconvenience involved in changing tires on the road is thereby avoided.

It will be noted that I have provided a novel mounting structure for the guide wheel 9 which permits the guide wheel to operate pivotally and respond easily to changes in the direction of travel, without the binding action which is commonly encountered in caster wheels of this type.

Further, it will be noted that a positive locking mechanism is employed in connection with the rotation of the plate 27, so that any tendency of the tire to overrun the plate and thereby cause counter-rotation thereof is obviated.

And lastly, it is to be noted that I have devised means for raising the rear wheels of the dolly off the road when the dolly is being loaded, thereby increasing the frictional resistance between the dolly and the road during the period when the vehicle wheel is moving up the ramp.

It is to be understood that the form of my invention, herewith shown and described, is to be taken as a preferred example of the same, and that various changes in the shape, size and arrangement of the parts may be resorted to, without departing from the spirit of my invention or the scope of the subjoined claims.

Having thus described my invention, I claim:

1. In a dolly for a vehicle wheel, the combination of a frame, vehicle wheel support members mounted in spaced relationship on said frame, and three wheels supporting said frame, one of said wheels being rotatably mounted on an axle journalled in a yoke member, the joined end of said yoke member being connected to said frame for pivotal movement in a horizontal plane, and the legs of said yoke member being adapted to slidably engage a horizontally disposed track portion of said frame whereby said yoke supports said frame at three spaced points.

2. A combination, as defined in claim 1, in which rollers are mounted on the legs of said yoke member for rolling contact with said track portion.

3. In a dolly for a vehicle wheel, that improvement in the mounting of a vertically pivoted guide wheel comprising a yoke member, an axle journalled in said yoke member, and a wheel rotatably mounted on said axle, the joined ends of said yoke being pivotally connected to the frame of said dolly and the legs of said yoke being adapted to slidably engage the frame of said dolly whereby said yoke supports said frame at three spaced points.

4. An improvement, as defined in claim 3, in which rollers are mounted for horizontal rotation on the legs of said yoke member.

5. In a dolly for a vehicle wheel, the combination of a U-shaped frame, an axle journalled in the free ends of said frame, wheels mounted on said axle, a ramp mounted for pivotal movement about said axle whereby the weight of said vehicle wheel causes said ramp to be rotated to a vehicle wheel supporting position, a vehicle wheel support member pivotally connected to said frame in spaced relationship to said axle, a king pin vertically suspended from said frame, a yoke member rotatably mounted on said king pin, a wheel mounted for rotation between the legs of said yoke, rollers mounted on the legs of said yoke, said rollers being adapted to engage a horizontally disposed track provided on said frame, whereby said yoke engages said frame at three spaced points.

6. In a dolly for a vehicle wheel, the combination of a frame mounted on wheels, a vehicle wheel supporting plate pivotally mounted on said frame, a locking rod pivotally mounted on said frame in normal overlapping relationship to said plate, whereby said vehicle wheel causes said plate and said rod to rotate toward each other, and rod-arresting means adapted to cooperate with said locking rod, whereby rotation of said locking rod is limited to a position at which said plate is locked against counter-rotation.

7. A combination, as defined in claim 6, in which said rod-arresting means comprise projections provided on said plate.

8. A dolly for wheeled vehicles comprising a frame, an axle carried by said frame, wheels rotatably mounted on said axle, a yoke pivotally connected to said frame and adapted to slidably engage said frame at three spaced points, a guide wheel rotatably mounted in said yoke, a ramp pivotally mounted on said axle and adapted to normally form a path from the road surface to said frame; means, responsive to engagement of said ramp with the road surface, for causing said wheels to be elevated, a cross-bar mounted on said frame, a plate pivotally connected to said cross-bar, a locking rod pivotally secured to said frame in overlapping relationship to said plate, and projections on said plate adapted to arrest rotation of said locking rod, whereby movement of a vehicle wheel onto said dolly will cause said ramp to rotate to a vehicle wheel supporting position and will cause said plate to be locked by said rod in a blocking position, thereby supporting said vehicle wheel in an elevated position relative to the road surface.

9. In a dolly for a vehicle wheel, the combination of a frame mounted on wheels, a vehicle wheel supporting plate mounted on said frame for pivotal movement in a vertical plane between a substantially horizontal position and an inclined position wherein it functions to block forward motion of the vehicle wheel relatively to the dolly, and means responsive to movement of the vehicle wheel toward said plate for locking said plate in wheel blocking position.

10. A dolly, as defined in claim 9, in which said means comprises a locking bar mounted on said frame for pivotal movement in a vertical plane and adapted to be engaged and rotated by the vehicle wheel.

11. A dolly, as defined in claim 10, in which said plate is provided with stops adapted to limit said rotation of said locking bar.

12. A dolly, as defined in claim 11, in which said locking bar is rotated by the vehicle wheel in a direction opposite to that in which said plate is rotated when moved to its wheel blocking position.

LUTHER V. DAY.

REFERENCES CITED

The following references are of record in the file of this patent:

UNITED STATES PATENTS

| Number | Name | Date |
|---|---|---|
| 834,146 | Lewis | Oct. 23, 1906 |
| 1,536,611 | Duke | May 5, 1925 |
| 2,198,438 | Knapp | Apr. 23, 1940 |
| 2,247,717 | Sutter | July 1, 1941 |
| 2,309,198 | McCleneghan | Jan. 26, 1943 |
| 2,358,864 | Lockwood | Sept. 26, 1944 |
| 2,414,383 | Merriam | Jan. 14, 1947 |
| 2,437,811 | Folden | Mar. 16, 1948 |
| 2,491,318 | Knapp | Dec. 13, 1949 |
| 2,494,725 | Schwitzer et al. | Jan. 17, 1950 |

FOREIGN PATENTS

| Number | Country | Date |
|---|---|---|
| 234,266 | Great Britain | May 28, 1925 |
| 108,226 | Switzerland | Jan. 31, 1924 |